(12) United States Patent
Ashikhmin

(10) Patent No.: US 8,775,490 B2
(45) Date of Patent: Jul. 8, 2014

(54) METHOD AND APPARATUS FOR COMPRESSIVE SENSING WITH REDUCED COMPRESSION COMPLEXITY

(75) Inventor: Alexei Ashikhmin, Morristown, NJ (US)

(73) Assignee: Alcatel Lucent, Paris (FR)

( * ) Notice: Subject to any disclaimer, the term of this patent is extended or adjusted under 35 U.S.C. 154(b) by 586 days.

(21) Appl. No.: 13/021,481

(22) Filed: Feb. 4, 2011

(65) Prior Publication Data
US 2012/0203810 A1  Aug. 9, 2012

(51) Int. Cl.
*G06F 7/00*  (2006.01)
(52) U.S. Cl.
USPC .......................................................... 708/203
(58) Field of Classification Search
None
See application file for complete search history.

(56) References Cited

U.S. PATENT DOCUMENTS

| | | | |
|---|---|---|---|
| 2011/0090394 A1* | 4/2011 | Tian et al. | 348/424.1 |
| 2012/0053948 A1* | 3/2012 | Mustiere et al. | 704/500 |
| 2012/0076401 A1* | 3/2012 | Sanchez et al. | 382/159 |
| 2012/0082344 A1* | 4/2012 | Donoho | 382/103 |
| 2012/0203810 A1* | 8/2012 | Ashikhmin | 708/203 |

OTHER PUBLICATIONS

A.R. Calderbank, S. Howard, S. Jafarpour,"Sparse Reconstruction via the Reed-Muller Sieve", IEEE Intl Symposium on Info Theory, pp. 1973-1977,2010.
A.R. Calderbank, S. Howard, S. Jafarpour, Construction of a Large Class of Deterministic Sensing Matrices . . . , IEEE Selected Topics Signal Proc., pp. 358-374, vol. 4, #2, 2010.
A.R.Calderbank, E. Rains, P.W. Shor, N.J.A. Sloane, Quantum Error Correction via Codes Over GF(4), IEEE Trans on Info Theory, vol. 44, pp. 1369-1387, 1998.
Vaneet Aggarwal et al: "Enhanced CDMA Communications Using Compressed-Sensing Reconstruction Methods", IEEE 47th Annual Allerbn Conf Sep. 30, 2009, pp. 1211-1215, XP031616296.
Cevher V. et al: "Sparse Signal Recovery and Acquisition with Graphical Models", IEEE Signal Processing Magazine, vol. 27, No. 6, Nov. 1, 2010, XP011317695, p. 92-102.
Guihua Zeng et al: "A Generalized Reverse Block JacketTransform", IEEE Transactions on Circuits and Systems Jul. 1, 2008, pp. 1589-1600 XP011333146.
PCT/US2012/023464, Notification of Transmittal of the International Search Report and the Written Opinion of the Intl Searching Authority, or the Declaration, dated Apr. 27, 2012.

* cited by examiner

*Primary Examiner* — David H Malzahn
(74) *Attorney, Agent, or Firm* — J. K. Jacobs

(57) ABSTRACT

Various methods and devices are provided to address the need for reduced compression complexity in the area of compressive sensing. In one method, a vector x is compressed to obtain a vector y according to $y=\Phi_{RD}x$, where $\Phi_{RD}=U\Phi_{RM}\cdot\Phi_{RM}$ is a compressive sensing matrix constructed using a second-order Reed-Muller code or a subcode of a second-order Reed-Muller code and U is a unitary matrix from the real or complex Clifford group G. In another method, vector y is decompressed to obtain vector x also according to $y=\Phi_{RD}x$. In some embodiments, decompression may involve computing $y'=U^{-1}y$ and then determining the vector x using the computed y'.

7 Claims, 3 Drawing Sheets

METHOD AND APPARATUS FOR COMPRESSIVE SENSING WITH REDUCED COMPRESSION COMPLEXITY

FIELD OF THE INVENTION

The present invention relates generally to compressive sensing techniques and, in particular, to reducing compression complexity.

BACKGROUND OF THE INVENTION

This section introduces aspects that may help facilitate a better understanding of the inventions. Accordingly, the statements of this section are to be read in this light and are not to be understood as admissions about what is prior art or what is not prior art.

A compressive sensing scheme allows compression of a sparse vector x of real or complex numbers (that is, a vector whose entries are primarily zeros, only few being non-zero) into a short vector y. The vector x can then be reconstructed from y with high accuracy. Such compressive sensing schemes have numerous applications.

Typically the number of entries of y (say M) is much smaller than the number of entries of x (say N). The number N/M is the compression ratio. Thus, instead of keeping in memory (or instead of transmitting, working with, etc.) N real (complex) numbers we have to keep only M real (complex) numbers.

Below is a list of references that are referred to throughout the present specification:

[1] A. R. Calderbank, S. Howard, S. Jafarpour, "Sparse reconstruction via the Reed-Muller Sieve," IEEE International Symposium on Information Theory, pp. 1973-1977, 2010.

[2] A. R. Calderbank, S. Howard, S. Jafarpour, "Construction of a Large Class of Deterministic Sensing Matrices That Satisfy a Statistical Isometry Property," IEEE Journal of Selected Topics in Signal Processing, pp. 358-374, Vol. 4., no. 2, 2010.

[3] A. R. Calderbank, E. Rains, P. W. Shor, N. J. A. Sloane, "Quantum Error Correction Via Codes Over GF(4)," IEEE Trans. on Information Theory, vol. 44, pp. 1369-1387, 1998.

The compressive sensing scheme proposed in [1,2] has good performance. In particular, it has a good compression ratio N/M, it affords a low-complexity decompression algorithm (i.e., reconstruction of x from y), and it has a good accuracy of decompression. However, it does have a high compression complexity, that is, the complexity of computing y from x.

Thus, new techniques that are able to reduce compression complexity would meet a need and advance compression technology in general.

Figure 1:
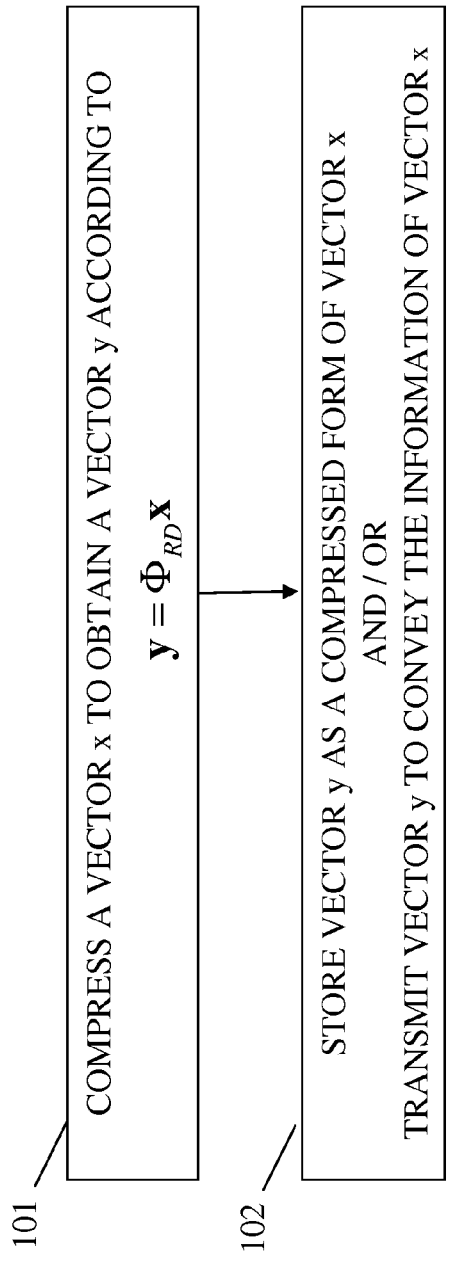
FIG. 1 is a logic flow diagram of compression-related functionality in accordance with various embodiments of the present invention.

Specific embodiments of the present invention are disclosed below with reference to FIGS. 1-3. Both the description and the illustrations have been drafted with the intent to enhance understanding. For example, the dimensions of some of the figure elements may be exaggerated relative to other elements, and well-known elements that are beneficial or even necessary to a commercially successful implementation may not be depicted so that a less obstructed and a more clear presentation of embodiments may be achieved. In addition, although the logic flow diagrams above are described and shown with reference to specific steps performed in a specific order, some of these steps may be omitted or some of these steps may be combined, sub-divided, or reordered without departing from the scope of the claims. Thus, unless specifically indicated, the order and grouping of steps is not a limitation of other embodiments that may lie within the scope of the claims.

Simplicity and clarity in both illustration and description are sought to effectively enable a person of skill in the art to make, use, and best practice the present invention in view of what is already known in the art. One of skill in the art will appreciate that various modifications and changes may be made to the specific embodiments described below without departing from the spirit and scope of the present invention. Thus, the specification and drawings are to be regarded as illustrative and exemplary rather than restrictive or all-encompassing, and all such modifications to the specific embodiments described below are intended to be included within the scope of the present invention.

SUMMARY OF THE INVENTION

Various methods and devices are provided to address the need for reduced compression complexity in the area of compressive sensing. In one method, a vector x is compressed to obtain a vector y according to $y=\Phi_{RD}x$, where $\Phi_{RD}=U\Phi_{RM}\cdot\Phi_{RM}$ is a compressive sensing matrix constructed using a second-order Reed-Muller code or a subcode of a second-order Reed-Muller code and U is a unitary matrix from the real or complex Clifford group G. In another method, vector y is decompressed to obtain vector x also according to $y=\Phi_{RD}x$. In some embodiments, decompression may involve computing y', $U^{-1}y$ and then determining the vector x using the computed y'. An article of manufacture is also provided, the article comprising a processor-readable storage medium storing one or more software programs which when executed by one or more processors performs the steps of any of these methods.

A first and a second apparatus is also provided. Both apparatuses include interface circuitry and a processing device, coupled to the interface circuitry. In the first apparatus, the processing device is adapted to compress a vector x to obtain a vector y according to $y=\Phi_{RD}x$, wherein $\Phi_{RD}=U\Phi_{RD}$, $\Phi_{RM}$ being a compressive sensing matrix constructed using a second-order Reed-Muller code or a subcode of a second-order Reed-Muller code and U being a unitary matrix from the real or complex Clifford group G. In the second apparatus, the processing device is adapted to decompress a vector y to obtain a vector x according to $y=\Phi_{RD}x$, wherein $\Phi_{RD}=U\Phi_{RM}$, $\Phi_{RM}$ being a compressive sensing matrix constructed using a second-order Reed-Muller code or a subcode of a second-order Reed-Muller code and U being a unitary matrix from the real or complex Clifford group G.

DETAILED DESCRIPTION OF EMBODIMENTS

To provide a greater degree of detail in making and using various aspects of the present invention, a description of our approach to reducing compression complexity and a description of certain, quite specific, embodiments follows for the sake of example.

The approach described herein is able to reduce the complexity of a compressive sensing scheme proposed by Caldebank et. al [1,2], while not sacrificing performance. In particular, our approach is able to achieve a significantly smaller (i.e., approximately 30% less) compression complexity (the complexity of computing y from x) while exhibiting the same performance.

A compressive sensing scheme is organized as follows. We would like to compress a vector $x=(x_1, \ldots, x_N)$ that has only a few nonzero components. In other words, it is a priory known that only few entries $x_j$ of x are not zeros. In order of doing this we compute the vector $$y = \Phi x, \quad (1)$$

where $\Phi$ is an M×N compressive sensing matrix. Typically, N is much larger than M. If the matrix $\Phi$ satisfies certain properties, then the vector x can be reconstructed from the vector y with high accuracy.

It is known that a randomly chosen matrix $\Phi$ provides a good compression ratio N/M and good accuracy of decompression (reconstruction of x from y). At the same time, if one uses a random $\Phi$ the decompression is high.

Recently, Calderbank et. al [1,2] suggested using the well-known second-order Reed-Muller error correcting codes RM(2,m) for construction of the matrix $\Phi$. The code RM(2,m) consists of $$2^k, k = 1 + m + \binom{m}{2}, \quad (2)$$

$2^m$-tuples with entries 1 or $-1$. For instance, RM(2,3) consists of $$2^k = 128, k = 1 + 3 + \binom{3}{2} = 7,$$

$2^3=8$-tuples such that each tuple has an enve number of $-1$s. The following 8-tuples:

$$\begin{pmatrix}1\\1\\1\\1\\1\\1\\1\\1\end{pmatrix}, \begin{pmatrix}1\\1\\1\\-1\\1\\1\\1\\-1\end{pmatrix}, \begin{pmatrix}1\\1\\1\\1\\-1\\-1\\-1\\-1\end{pmatrix}$$

are typical instances of 8-tuples from RM(2,3).

In [1,2] Calderbank et. al it is also suggested to use subcodes of RM(2,m) for construction of the matrix $\Phi$. In particular, they suggest to use the Kerdock code and Delsarte-Goethals codes, which are subcodes of RM(2,m) codes, for construction of the matrix $\Phi$. We will consider only RM(2,m) codes; however, subcodes of RM(2,m) can be treated in a similar way.

In [1,2] it is suggested to use $2^m$-tuples from RM(2,m) as columns of the compressive sensing matrix $\Phi_{RM}$. Thus, we have $M=2^m$. If all $2^k$ $2^m$-tuples from RM(2,m) are used as columns of $\Phi_{RM}$ we have $N=2^k$ and the ratio rate is $N/M=2^k/2^m$, where k is defined in (2).

In [1,2] it is also suggested to use only some $2^m$-tuples from RM(2,m) to form columns of a compressive sensing matrix $\Phi$. In this case, we will have $N<2^k$. Hence in this case, the compression becomes smaller, but it is shown in [1,2] that the quality of decompression becomes better. Below, we will consider only the case when all $2^k$ $2^m$-tuples from RM(2,m) are used to form columns of compressive sensing matrix $\Phi_{RM}$. At the same time, we would like to point out that the proposed approach can be applied in exactly the same way if only some of the $2^k$ $2^m$-tuples are used to form a compressive sensing matrix.

In [1,2] it is shown that the matrix $\Phi_{RM}$ gives a good compression ratio $N/M=2^k/2^m$, affords a low complexity decompression algorithm (reconstruction of x from y), and has a good accuracy of reconstruction of x. The disadvantage of the matrix $\Phi_{RM}$ is that all its entries are nonzero. Hence, the compression complexity of y from x requires about M·N summations or real numbers. Typically, the numbers M and N can be very large (thousands or even tens of thousands). Therefore, the complexity M·N becomes prohibitively large for many practical applications.

We address the following problem, then. How to construct a reduced density compressive sensing matrix $\Phi_{RD}$ (that is, a matrix with multiple zero entries) that would have the same advantages as the matrix $\Phi_{RM}$, namely the same compression ratio, the same simple decompression algorithms, and the same accuracy of decompression.

Obviously, the matrix $\Phi_{RD}$ would have the same advantages as $\Phi_{RM}$, and in addition it would have smaller complexity of compression (computing y from x). In particular, if $\Phi_{RD}$ would have t zero entries, the compression complexity of computing y would be approximately M·N−t instead of M·N. Thus, we would get a pure gain—the same performance with smaller complexity.

We suggest to take a unitary matrix U from the real (or complex) Clifford group G defined, for instance, in [3] (section II) and the references therein. In [3] the real Clifford group is denoted by $L_R$ and the complex Clifford group is denoted by L. Although the group is not invented by the authors of [3], it is described with references to other papers where this group was also considered. Below we consider only the real Clifford group. The case of complex Clifford group can be done similarly. According to the description in [3] the real Clifford group is generated by unitary matrices from sets $S_1$, $S_2$ defined below.

1. $S_1=\{$matrix of the form $$\underbrace{I_2 \otimes \ldots \otimes I_2 \otimes H_2 \otimes I_2 \otimes \ldots \otimes I_2}_{m \text{ factors}}\} \text{ where } I_2 = \begin{pmatrix}1 & 0\\0 & 1\end{pmatrix}$$

is the 2×2 identity matrix, and $$H_2 = \frac{1}{\sqrt{2}}\begin{pmatrix}1 & 1\\-1 & 1\end{pmatrix},$$

and $\otimes$ denotes the tensor product of matrices.

2. Let A be a $2^m \times 2^m$ binary symmetric matrix and let $j=(j_0, \ldots, j_{m-1})$ be the binary representation of an integer j j,$0 \leq j \leq m-1$. For instance $$A = \begin{pmatrix} 0 & 1 & 1 \\ 1 & 0 & 1 \\ 1 & 1 & 1 \end{pmatrix},$$

and if j=6 then j=(0,1,1). Denote by $j^T$ the transposition of the vector j.

$$S_2 = \{\text{diagonal matrices with diagonals}(d_0, d_1, \ldots, d_{2^m-1}), d_j = (-1)^{jAj^T}\}$$

In other words, matrix U from G can be obtained as $U=U_1U_2$, $U_1 \in S_1$, $U_2 \in S_2$. We further suggest to form the compressive compression matrix $\Phi_{RD}$ by $$\Phi_{RD} = U \Phi_{RM} \quad (3)$$

and to use for compression sparse vectors x according to (1). Typically, the matrix $\Phi_{RD}$ has reduced density, in other words $\Phi_{RD}$ has many zeros. Typically, $\Phi_{RD}$ is approximately 30% zeros. Since $\Phi_{RD}$ has many zeros, the compression y=$\Phi_{RD}$x may be completed with small complexity. Since U is unitary, the matrix $\Phi_{RD}$ has exactly the same compression capabilities as the matrix $\Phi_{RM}$. Moreover, $\Phi_{RD}$ has the other advantages of $\Phi_{RM}$.

Now consider an example. It is easy to check that in the case m=3 the matrix $$U_1 = \frac{1}{2} \begin{pmatrix} 1 & 1 & 1 & 1 & & & & \\ 1 & -1 & 1 & -1 & & & & \\ 1 & 1 & -1 & -1 & & & & \\ 1 & -1 & -1 & 1 & & & & \\ & & & & 1 & 1 & 1 & 1 \\ & & & & 1 & -1 & 1 & -1 \\ & & & & 1 & 1 & -1 & -1 \\ & & & & 1 & -1 & -1 & 1 \end{pmatrix}$$

belongs to the set $S_1$ and that the identity matrix $I_8$ belongs to the set $S_2$. Hence, we can form the matrix $U=U_1I_8=U_1$. Applying the matrix U to $\Phi_{RM}$ we obtain a matrix $\Phi_{RD}$ with 384 zero entries, which is about 37% of the total number of entries (8*128=1024) of the matrices $\Phi_{RM}$ and $\Phi_{RD}$.

As mentioned above, it is shown in [1,2] that the matrix $\Phi_{RM}$ has relatively simple decompression algorithms. We propose the following decompression algorithm for matrix $\Phi_{RD}$. Let y=$\Phi_{RD}$x. For reconstruction of x from y, we can use the following simple algorithm:

Compute $y'=U^{-1}y=U^{-1}\Phi_{RD}x=U^{-1}U\Phi_{RM}x=\Phi_{RM}x$

Then, use any algorithms suggested in [1,2], or in any other place, for reconstruction of x from y'.

Compressive sensing, in general, has quite a few applications. For instance, if we transmit a movie then typically frame $F_j$ and frame $F_{j+1}$ are different only by a few pixels. So we can compute the vector x=$F_{j+1}-F_j$ and it will be equal to zero everywhere except where the pixels in $F_j$ and $F_{j+1}$ are different. Next, we can compress the sparse vector x into a short vector y and transmit y instead of transmitting x or long $F_{j+1}$.

This is just one example of how compressive sensing may be used. Generally, any application in which sparse vectors represent information that is stored or transmitted may benefit from this type of compression. Compressive schemes suggested in [1,2] are very attractive for such practical applications. However, our approach can provide a 30-50% reduction in the compressive complexity, without any performance loss, over the schemes from [1,2].

The detailed and, at times, very specific description above is provided to effectively enable a person of skill in the art to make, use, and best practice the present invention in view of what is already known in the art. In the examples, specifics are provided for the purpose of illustrating possible embodiments of the present invention and should not be interpreted as restricting or limiting the scope of the broader inventive concepts.

Figure 2:
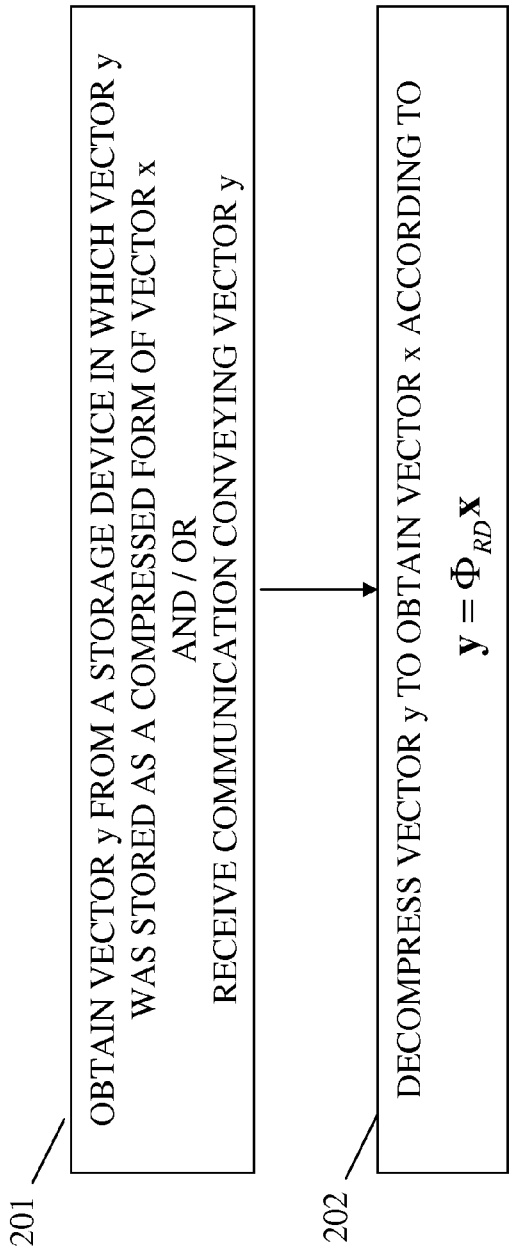
FIG. 2 is a logic flow diagram of decompression-related functionality in accordance with various embodiments of the present invention.
Figure 3:
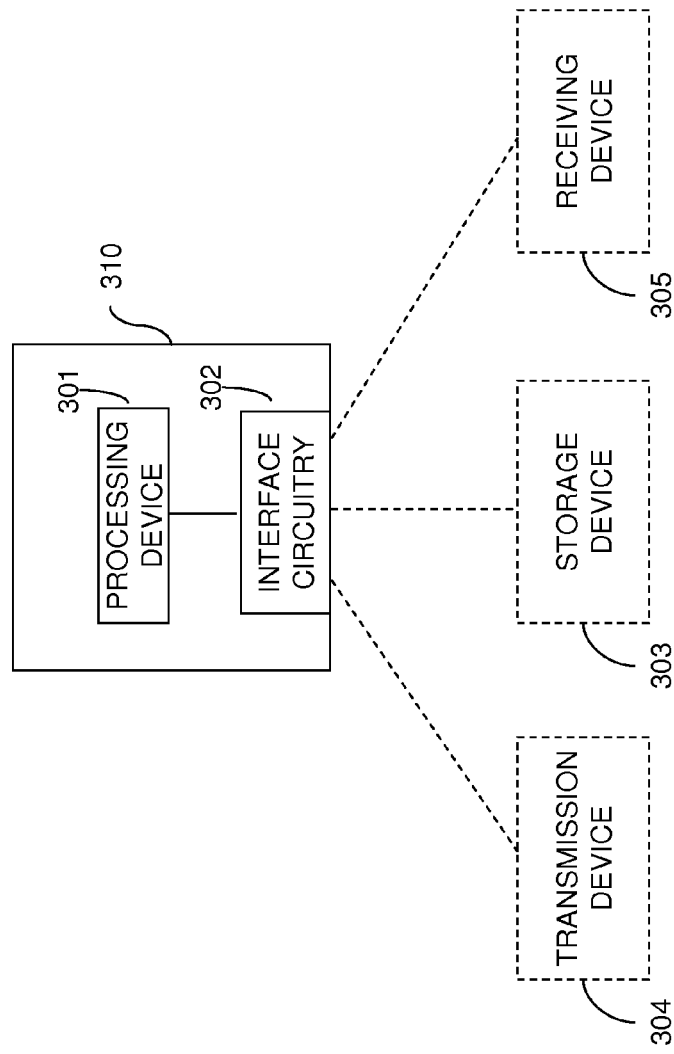
FIG. 3 is a block diagram depiction of an apparatus in accordance with various embodiments of the present invention.

Aspects of additional embodiments of the present invention can be understood with reference to FIGS. 1-3. Diagram 100 of FIG. 1 is a logic flow diagram of functionality in accordance with various embodiments of the present invention. In the method depicted in diagram 100, a vector x is compressed (101) to obtain a vector y according to y=$\Phi_{RD}$x, where $\Phi_{RD}$=U$\Phi_{RM}$·$\Phi_{RM}$ is a compressive sensing matrix constructed using a second-order Reed-Muller code or a subcode of a second-order Reed-Muller code and U is a unitary matrix from the real or complex Clifford group G. Depending on the embodiment, vector y may be stored (102) as a compressed form of vector x and/or vector y may be transmitted to convey the information of vector x. This transmission may take any form of communication. For example, it may be transmitted wirelessly or transmitted via a communication bus or network or some combination of all of these forms.

Diagram 200 of FIG. 2 is also a logic flow diagram of functionality in accordance with various embodiments of the present invention. In the method depicted in diagram 200, communication conveying a vector y may be received (201) or vector y may be obtained from a storage device in which vector y was stored as a compressed form of vector x. Vector y is decompressed (202) to obtain vector x according to y=$\Phi_{RD}$x. In some embodiments, decompression may involve computing $y'=U^{-1}y$ and then determining the vector x using the computed y'.

A person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

Diagram 300 of FIG. 3 is a block diagram depiction of an apparatus in accordance with various embodiments of the present invention. Diagram 300 depicts an apparatus 310 that includes a processing device 301 and interface circuitry 302. Depending on the embodiment, interface circuitry 302 may interface with a storage device 303, a transmission device 304, and/or a receiving device 305. While apparatus 310 may perform only compression or only decompression operations and while it may operate without storage device 303, transmission device 304, or receiving device 305, for the sake of illustration, embodiments will be described in which apparatus 310 performs both compression and decompression and in which at least one of the devices 303-305 is also included.

In some embodiments, processing device 301 compresses a vector x to obtain a vector y according to y=$\Phi_{RD}$x, wherein $\Phi_{RD}$=U$\Phi_{RM}$, $\Phi_{RM}$ being a compressive sensing matrix constructed using a second-order Reed-Muller code or a subcode of a second-order Reed-Muller code and U being a unitary matrix from the real or complex Clifford group G. Vector y may then be stored in storage device 303 and/or transmitted via transmission device 304.

In some embodiments, communication conveying a vector y may be received by receiving device 305 or vector y may be obtained from storage device 3003 in which vector y has been stored as a compressed form of vector x. Vector y is decompressed by processing device 301 to obtain vector x according to $y=\Phi_{RD}x$. In some embodiments, decompression may involve computing $y'=U^{-1}y$ and then determining the vector x using the computed y'.

The functions of the various elements shown in the FIGs., including any functional blocks labeled as "processing device", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processing device" or "processor" should not be construed to refer exclusively to hardware capable of executing software, and may implicitly include, without limitation, digital signal processor (DSP) hardware, a network processor, an application specific integrated circuit (ASIC), a field programmable gate array (FPGA), a read only memory (ROM) for storing software, a random access memory (RAM), and non-volatile storage. Other hardware, conventional and/or custom, may also be included. Similarly, any switches shown in the FIGs. are conceptual only. Their function may be carried out through the operation of program logic, through dedicated logic, through the interaction of program control and dedicated logic, or even manually, the particular technique being selectable by the implementer as more specifically understood from the context.

Moreover, storage device 303 may comprise virtually any device able to store information, depending on the embodiment. This would include, without limitation, all varieties of memory devices and magnetic and optical storage devices. Similarly, since communication may take any form (e.g., wireless, electrical, and/or optical), transmission device 304 and receiving device 305 may comprise any device able to either transmit or receive communication, according to the needs of the particular embodiment.

Benefits, other advantages, and solutions to problems have been described above with regard to specific embodiments of the present invention. However, the benefits, advantages, solutions to problems, and any element(s) that may cause or result in such benefits, advantages, or solutions, or cause such benefits, advantages, or solutions to become more pronounced are not to be construed as a critical, required, or essential feature or element of any or all the claims.

As used herein and in the appended claims, the term "comprises," "comprising," or any other variation thereof is intended to refer to a non-exclusive inclusion, such that a process, method, article of manufacture, or apparatus that comprises a list of elements does not include only those elements in the list, but may include other elements not expressly listed or inherent to such process, method, article of manufacture, or apparatus. The terms a or an, as used herein, are defined as one or more than one. The term plurality, as used herein, is defined as two or more than two. The term another, as used herein, is defined as at least a second or more. Unless otherwise indicated herein, the use of relational terms, if any, such as first and second, top and bottom, and the like are used solely to distinguish one entity or action from another entity or action without necessarily requiring or implying any actual such relationship or order between such entities or actions.

The terms including and/or having, as used herein, are defined as comprising (i.e., open language). The term coupled, as used herein, is defined as connected, although not necessarily directly, and not necessarily mechanically. Terminology derived from the word "indicating" (e.g., "indicates" and "indication") is intended to encompass all the various techniques available for communicating or referencing the object/information being indicated. Some, but not all, examples of techniques available for communicating or referencing the object/information being indicated include the conveyance of the object/information being indicated, the conveyance of an identifier of the object/information being indicated, the conveyance of information used to generate the object/information being indicated, the conveyance of some part or portion of the object/information being indicated, the conveyance of some derivation of the object/information being indicated, and the conveyance of some symbol representing the object/information being indicated.

What is claimed is:

1. An apparatus comprising:
   interface circuitry; and
   a processing device, coupled to the interface circuitry,
      adapted to compress a vector x to obtain a vector y according to $y=\Phi_{RD}x$,
      wherein $\Phi_{RD}=U\Phi_{RM}$, $\Phi_{RM}$ being a compressive sensing matrix constructed using a second-order Reed-Muller code or a subcode of a second-order Reed-Muller code and U being a unitary matrix from the real or complex Clifford group G.

2. The apparatus of claim 1, further comprising
   a storage device, operatively coupled to the interface circuitry, adapted to store vector y as a compressed form of vector x.

3. The apparatus of claim 1, further comprising
   a transmission device, operatively coupled to the interface circuitry, adapted to transmit vector y to convey the information of vector x.

4. An apparatus comprising:
   interface circuitry; and
   a processing device, coupled to the interface circuitry,
      adapted to compress a vector x to obtain a vector y according to $y=\Phi_{RD}x$,
      wherein $\Phi_{RD}=U\Phi_{RM}$, $\Phi_{RM}$ being a compressive sensing matrix constructed using a second-order Reed-Muller code or a subcode of a second-order Reed-Muller code and U being a unitary matrix from the real or complex Clifford group G.

5. The apparatus of claim 4, wherein being adapted to decompress the vector y to obtain the vector x comprises being adapted
   to compute $y'=U^{-1}y$ and
   to determine the vector x using the computed y'.

6. The apparatus of claim 4, further comprising
   a storage device, operatively coupled to the interface circuitry, adapted to store vector y as a compressed form of vector x.

7. The apparatus of claim 4, further comprising
   a receiving device, operatively coupled to the interface circuitry, adapted to receive communication conveying vector y.

* * * * *